(No Model.)
J. F. KINGSLEY.
DIE FOR MAKING EYE BARS.
No. 369,014. Patented Aug. 30, 1887.
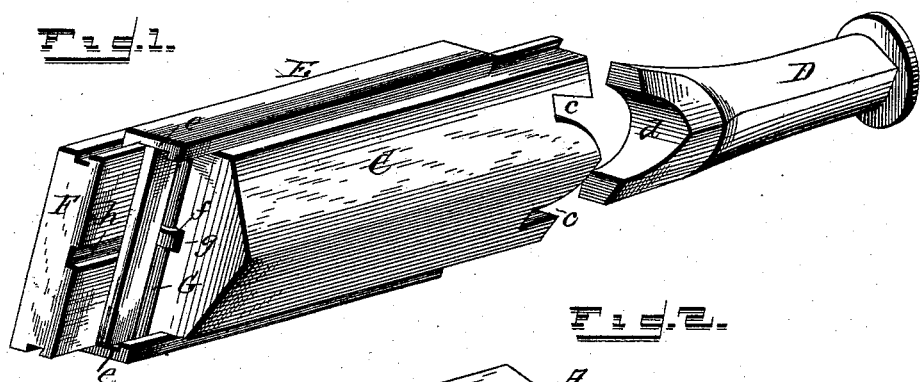
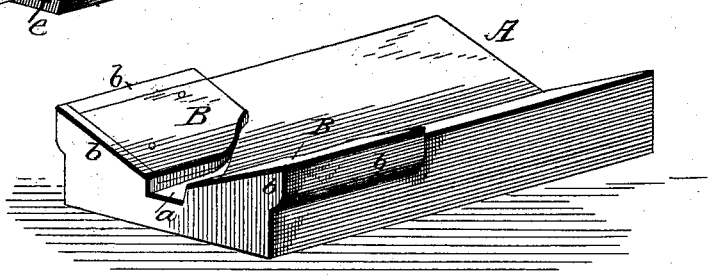
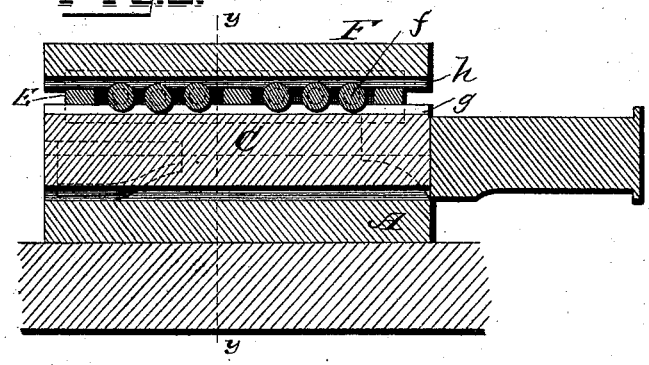
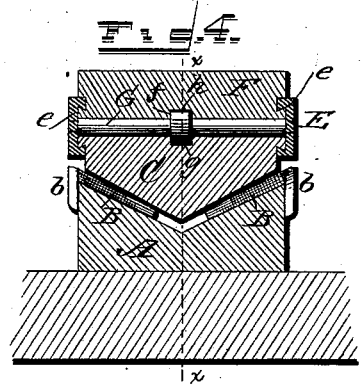
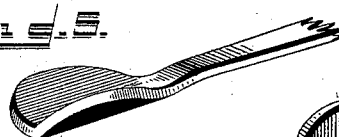
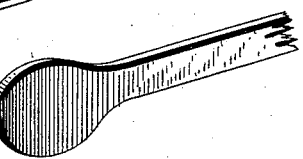
Witnesses
G. S. Elliott
L. L. Miller
Inventor
John F. Kingsley,
By his Attorney
Chas. H. Fowler

UNITED STATES PATENT OFFICE.

JOHN F. KINGSLEY, OF ATHENS, PENNSYLVANIA.

DIE FOR MAKING EYE-BARS.

SPECIFICATION forming part of Letters Patent No. 369,014, dated August 30, 1887.

Application filed April 4, 1887. Serial No. 233,543. (No model.)

*To all whom it may concern:*

Be it known that I, JOHN F. KINGSLEY, a citizen of the United States, residing at Athens, in the county of Bradford and State of Pennsylvania, have invented certain new and useful Improvements in Dies and Connections for Making Eye-Bars; and I do hereby declare that the following is a full, clear, and exact description of the same, reference being had to the annexed drawings, making a part of this specification, and to the letters and figures of reference marked thereon.

Figure 1 of the drawings is a perspective view of the upper die-section and its attachments; Fig. 2, a similar view of the lower die-section; Fig. 3, a longitudinal central section of Fig. 4, taken on line $x\ x$; Fig. 4, a transverse section taken on line $y\ y$ of Fig. 3; Fig. 5, a perspective view in detail of so much of an eye-bar as is operated upon by my improved die; and Fig. 6, a similar view of a like portion of an eye-bar, the same being represented as finished and ready to be perforated.

The present invention has relation to dies for the manufacture of eye-bars, and is designed as an improvement on my former patent, dated February 15, 1887, No. 357,833; and the object thereof is to provide such a die with attachments that will materially facilitate the production of the eye-bar and enable them to be more perfectly and successfully formed; and it consists in forming the faces of the die-sections of different angles, and also constructing the lower one of said sections with a recess at one end, and providing the die upon each side of the recess with plates.

It further consists in providing the roller-frame with dovetail grooves upon its inner sides, to engage with similar-formed tongues on the sides of the upper die-section, and also the platen.

The invention also consists in providing the upper die-section, and also the platen, with central grooves, and providing the rollers with enlarged portions to fit therein to form a guide for holding the parts together and prevent them from lateral displacement, as will be hereinafter described and claimed.

In the accompanying drawings, A represents the lower die-section, which is triangular in cross-section upon its upper side, where the eye of the bar is formed, but made flat at one end, or, in other words, formed with a recess, as shown at $a$, said die-section being supported by the base or bed of the machine, as shown in Figs. 3 and 4.

The die-section A is provided at its recessed end with seats, to which are detachably connected plates B; or, in other words, the die-section is formed with flanges $b$ at its sides and ends, against which abut the edges of the plates above referred to, to hold them in place, said plates having their inner edges so shaped as to conform to that portion of the head of the eye-bar desired or to the thickness thereof. The upper and movable die-section, C, upon its under side is triangular in cross-section, but of a sharper angle than the lower die-section, A, so that when closed the space between the two enlarges from the center toward the side. The end of the die C is cut away to form recesses $c$ to receive the bifurcated end $d$ of the rammer D. The rammer D, upon its under side, is of such shape as to fit the triangular shape of the lower die-section, A, and the bifurcated end of the rammer, above described, is of such shape as to form the end of the upset portion of the bar when acted upon, and in operation this rammer is connected to the piston-rod of the machine.

Above the upper die-section, C, is a frame, E, the inner sides thereof having dovetailed grooves $e$, to fit correspondingly-formed tongues upon the outer side of the die-section C, and a platen, F, as more clearly shown in Fig. 4, said platen forming a part of or being fastened to the die-closer of the machine, which closer is of such common construction and well known that it is not deemed necessary to show in the drawings.

To the sides of the frame E are journaled the anti-friction rollers G, upon which bear the platen and upper die-section, said rollers having an enlarged bearing, $f$, midway of its end, which fits in grooves $g\ h$ in the lower die-section and platen, respectively, thereby forming a guide for the two when moving longitudinally, and the dovetailed grooves in the roller-frame, in connection with the correspondingly-formed tongues, provide further means for guiding the lower die-section and platen to prevent them from lateral displacement. The enlarged portion of the anti-friction rollers, hereinbefore referred to, performs a further office in that it keeps the upper die-section in a central position when it is raised or lowered.

In practice, the end of the bar (as it comes from the rollers with parallel sides and edges) is heated and laid upon the lower die-section, A, between the plates B. The upper die-section, C, is now forced down upon it to bend the bar longitudinally to conform to the angular space between the inner faces of the die-sections or the space between the same, and the bar is held from receding, the end thereof bearing against the bifurcated end of the rammer D when in position, as shown in Fig. 3. Power is now applied to the rammer, causing the upper die-section to move longitudinally over the lower die-section, thereby forcing the end of the bar to assume the shape as represented in Fig. 5, the rollers reducing the friction between the upper die-section and platen when they are being moved. This angular bending of the bar is for the purpose of keeping it straight during the process of upsetting. The enlarging-space between the die-sections, by forming the upper one thereof at a sharper angle, as hereinbefore described, permits the metal to be more freely forced outward to form the head, and at the same time holding the center so that no metal will be forced from one side to the other.

Having now fully described my invention, what I claim as new, and desire to secure by Letters Patent, is—

1. The combination of an upper and a lower die-section triangular in cross-section, as shown, the lower one of said sections having a recess at one end and the upper one of said sections having a greater or sharper angle than that of the lower section, whereby the space between the die-sections when closed will increase or enlarge from its center toward the sides thereof, substantially as and for the purpose set forth.

2. The combination of an upper and a lower die-section having their faces or meeting sides of different angles, and the lower one of said sections having a recess at one end, and plates, of the form substantially as described and shown, arranged upon each side thereof, for the purpose specified.

3. The combination, with a lower die-section triangular in cross-section, and an upper die-section, also triangular in section, and a platen arranged above it, of a frame provided with rollers and having dovetailed grooves upon its inner side to engage with similarly-formed tongues on the sides of the upper die-section and platen, substantially as and for the purpose set forth.

4. The combination, with a lower die-section and the upper die-section and platen having central grooves upon their inner sides, of the roller-frame and rollers having enlarged portions to fit in the grooves of the upper die-section and platen, substantially as and for the purpose set forth.

5. The combination, with the lower die-section and upper die-section, having at one end recesses, as shown, of a rammer having a bifurcated end adapted to engage therewith, whereby said upper die-section is operated, substantially as and for the purpose specified.

In testimony that I claim the above I have hereunto subscribed my name in the presence of two witnesses.

JOHN F. KINGSLEY.

Witnesses:
C. H. SATTERLEE,
C. A. SAWTELLE.